Nov. 1, 1938.                    J. FALLON                    2,135,175
                      ROLLER FOR CONVEYER FURNACES
                           Filed July 16, 1937
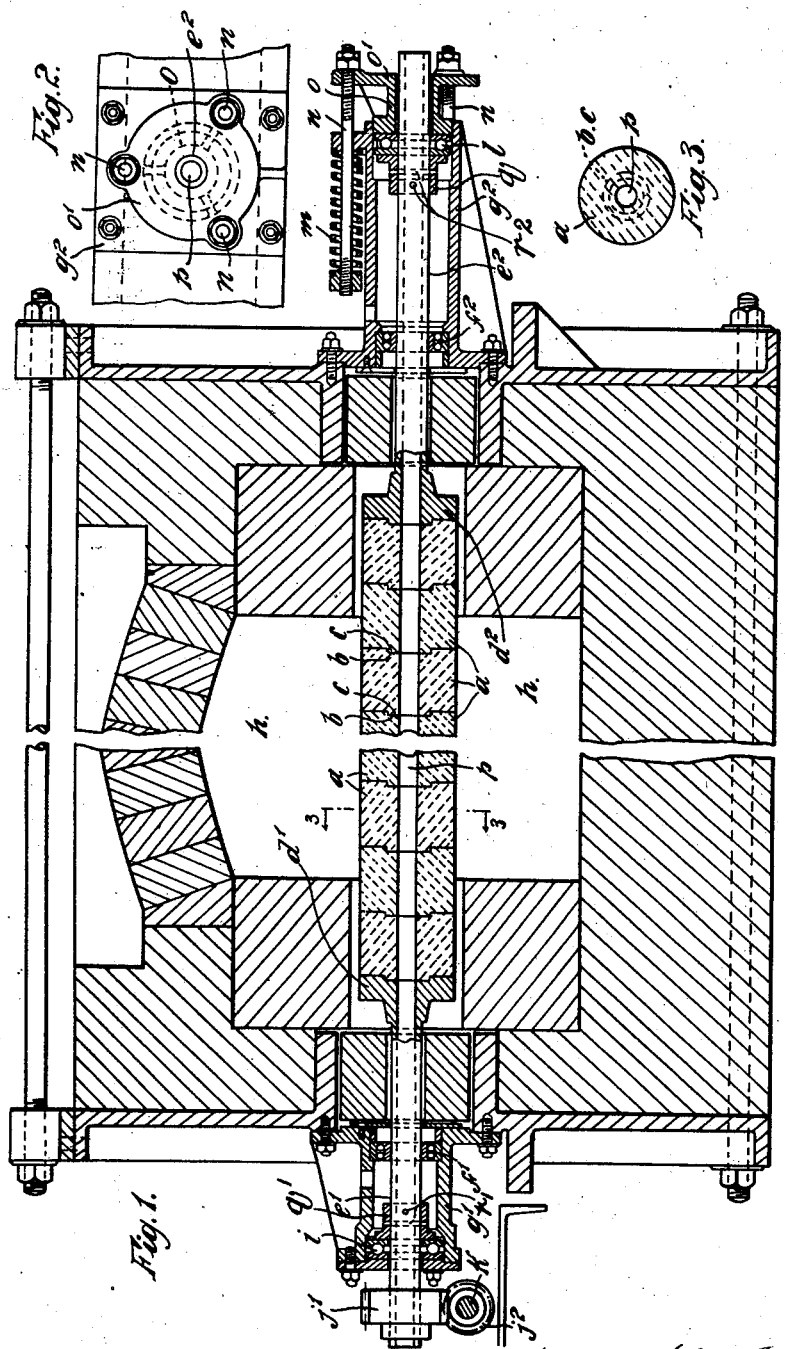
Inventor:- John Fallon.
Per:- George E. Folkes
                    Attorney.

Patented Nov. 1, 1938

2,135,175

UNITED STATES PATENT OFFICE 2,135,175

ROLLER FOR CONVEYER FURNACES

John Fallon, Smethwick, near Birmingham, England

Application July 16, 1937, Serial No. 154,008
In Great Britain July 23, 1936

1 Claim. (Cl. 263—6)

This invention has reference to improvements in connection with rollers for conveyer furnaces.

Rollers of the various types hitherto in use for the conveyance of goods through furnaces operating at high temperatures may be divided into the following classes:—

Firstly, rollers mounted on an axle which at the working temperature is of sufficient strength for the load and bending moment imposed on the roller, which may be either of disc or of barrel form;

Secondly, rollers in which the axle is cooled either by air, water, or otherwise in order to maintain the strength of the axle and to avoid stretch creep, oxidation, or other effects which might otherwise occur at high temperatures;

Thirdly, rollers in which the axle may be used as a tension member for providing a compressive stress or clamping action on the elements forming the barrel of the roller, the axle in this case being formed from material of the requisite tensile strength for the temperature imposed upon it.

As all metallic materials when subjected to high temperatures are liable to stretch creep effects, the position arises that uncooled axles show rapid depreciation due to continual stretch, and that cooled axles involve a considerable loss of heat from the furnace by way of the cooling medium.

According to the present invention there is provided a composite roller which is formed from a plurality of interengaging disc-like sections and which is externally loaded at its end or ends so as to maintain the entire roller as a compression structure, the axial compression being in excess of any opposed stresses to which the roller may be subjected by loading as a beam and by usage at the high working temperatures.

In order that the invention may be clearly understood and readily carried into practice, reference may be had to the appended explanatory drawing, in which:—

Figure 1 is a cross-sectional elevation of a roller conveyer type of furnace showing one of the improved rollers in longitudinal section.

Figure 2 is a partial side elevation of Figure 1, showing further details of the spring-loaded end bearing for the roller.

Figure 3 is a cross-section of the roller, on a plane indicated by the line 3—3 in Figure 1.

In a convenient method of carrying the invention into effect, a roller is built up from an axially aligned series of highly refractory discs $a$ made of a material such as Sillimanite, these discs having machined faces and being proportioned for example so as to be of a length equal to or somewhat less than the diameter, and being formed or provided with interengaging elements such for example as annular recesses $b$ and bosses $c$ so arranged that each disc $a$ matches up in perfect register with the adjacent disc.

The roller may consist for example of fifteen discs $a$ each 4" long and 6" in diameter, the end discs being fitted with metallic caps $d^1$ and $d^2$ which are carried respectively by stub shafts $e^1$ and $e^2$ extending through bearings $f^1$ and $f^2$ provided within flanged sleeve bearing brackets $g^1$ and $g^2$ fixed outside the furnace $h$. The stub shaft $e^1$ is further mounted in a stationary thrust bearing $i$ provided within the bracket $g^1$, and may be geared as at $j^1$ $j^2$ to a drive shaft $k$, the thrust bearing $i$ being adapted for pressure contact of a collar $q^1$ which is secured to the stub shaft for example by cotter pins $r^1$. The stub shaft $e^2$ at the opposite end is further supported by a thrust bearing $l$ which is similarly adapted for pressure contact with a collar $q^2$ secured by cotter pins $r^2$, and which is slidable within the bracket $g^2$ under the influence of a series of say three adjustable compression springs $m$ anchored by bolts $n$ to the flange $o^1$ of a slidable sleeve $o$ which abuts on the bearing $l$, the springs $m$ being thereby adapted to apply axial compression throughout all parts of the composite roller, to an extent exceeding the maximum tension which can be imposed on the underside of the roller when functioning as a beam and as part of a conveyer system transmitting goods through the furnace.

By this means a roller of high resistance to bending is obtained, its strength as a beam being a function of the externally applied compression loading.

If desired the compression springs $m$ may be associated with each of the end bearings of the roller, and each of the stub shafts may be fitted outside the furnace with a suitable series of radiation discs. Further, the composite roller and the stub shafts may be formed with a continuous axial hole $p$ to admit of the insertion of a removable aligning bar if required for purposes of assembly.

A roller constructed in accordance with the present invention has the following advantages:—(a) the central axle as a structural carrying member is eliminated; (b) the central axle as a tension member for imposing compression is eliminated; (c) highly refractory materials may be used which are entirely suitable for compression loading but which would be unsuitable for tension loading; (d) the heat losses due to the cooling of a central axle, or to conductivity of heat by a continuous central axle extending outside the furnace, are also eliminated.

In conclusion, it will be appreciated that a roller of this kind, in its function as a rotating and conveying beam, depends entirely for its strength on the means and degree of compression applied to its component refractory sections, and has negligible strength within itself except such as is conferred by the compressive forces externally applied, and is therefore not dependent on reactionary tensile forces within the structure of the roller proper.

I claim:

In a conveyer type of furnace, a conveyer roller of composite construction which comprises, in combination, a plurality of interengaging disclike refractory sections, metallic caps fitted respectively at opposite ends of said plurality of sections, stub shafts carrying the respective end caps and extending outwardly through opposite side walls of the furnace, flanged sleeve brackets fixed to said walls so as to enclose the projecting ends of the respective stub shafts, bearings within the inner ends of said sleeve brackets providing inner supports for the respective stub shafts, thrust bearings within the outer ends of said sleeve brackets providing outer supports for the respective stub shafts, collars fixed on the respective stub shafts in pressure contact with the inner faces of the respective thrust bearings, a flanged sleeve slidably mounted on the outer end of one of said stub shafts in pressure contact with the outer face of the respective thrust bearing, a plurality of bolts anchored to the flange of said slidable sleeve so as to extend inwardly through a flange of the respective fixed sleeve bracket, and a plurality of compression springs carried by the inner ends of said bolts so as to apply pressure to the adjacent end cap of the roller sections through said slidable sleeve and its associated thrust bearing, fixed collar, and stub shaft, and thereby to maintain the entire roller as a compression structure independent of any support by an axle, the axial pressure being in excess of any opposed stresses to which the roller may be subjected by loading as a beam and by usage at the high working temperatures of the furnace.

JOHN FALLON.